US009892493B2

(12) United States Patent
Pekkucuksen et al.

(10) Patent No.: US 9,892,493 B2
(45) Date of Patent: *Feb. 13, 2018

(54) METHOD, APPARATUS AND SYSTEM FOR PERFORMING GEOMETRIC CALIBRATION FOR SURROUND VIEW CAMERA SOLUTION

(71) Applicant: Texas Instruments Incorporated, Dallas, TX (US)

(72) Inventors: Ibrahim Ethem Pekkucuksen, Dallas, TX (US); Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,154

(22) Filed: Apr. 20, 2015

(65) Prior Publication Data

US 2015/0302561 A1 Oct. 22, 2015

Related U.S. Application Data

(60) Provisional application No. 61/982,045, filed on Apr. 21, 2014.

(51) Int. Cl.
| G06K 9/40 | (2006.01) |
| G06T 5/00 | (2006.01) |
| G06T 5/50 | (2006.01) |
| G06T 3/40 | (2006.01) |
| G06T 7/33 | (2017.01) |

(52) U.S. Cl.
CPC .......... *G06T 5/006* (2013.01); *G06T 3/4038* (2013.01); *G06T 5/50* (2013.01); *G06T 7/337* (2017.01);
(Continued)

(58) Field of Classification Search
CPC ......... G06T 3/4038; G06T 5/006; G06T 5/50; G06T 7/0018; G06T 7/003; G06T 7/0065;
(Continued)

(56) References Cited

U.S. PATENT DOCUMENTS 6,750,873 B1 * 6/2004 Bernardini ............ G06T 7/0065
345/581
7,133,083 B2 11/2006 Jaynes et al.
(Continued)

OTHER PUBLICATIONS

C. Harris and M. Stephens, "A Combined Corner and Edge Detector," Proc. Alvey Vision Conf. pp. 147-151, 1988.
(Continued)

*Primary Examiner* — Jose Couso
(74) *Attorney, Agent, or Firm* — Gregory J. Albin; Charles A. Brill; Frank D. Cimino

(57) ABSTRACT

A method, apparatus and a system multi-camera image processing method. The method includes performing geometric alignment to produce a geometric output by estimating fish eye distortion correction parameters, performing initial perspective correction on related frame, running corner detection in the overlapping areas, locating the stronger corner, calculating BRIEF descriptors for features and match feature point from two cameras using BRIEF scores, performing checks and rejecting wrong feature matches, finding perspective matrices to minimize distance between matched features; and creating a geometric lookup table.

20 Claims, 9 Drawing Sheets

(52) U.S. Cl.
CPC ........... *G06T 2207/20221* (2013.01); *G06T 2207/30252* (2013.01)

(58) Field of Classification Search
CPC ..... G06T 15/04; G06T 17/10; G06T 2200/08; G06T 2207/10016; G06T 2207/20221; G06T 2207/30252; G06T 3/00; G06T 3/0006; G06T 3/0012; G06T 3/0056; G06T 3/0062; G06T 3/0068; G06T 3/0075; G06T 3/0081; G06T 3/0087; G06T 3/0093; G06T 3/40; H04N 5/23238; H04N 5/247; H04N 5/3532; H04N 5/357; H04N 9/3147; H04N 9/3185; H04N 9/3194; H04N 5/2258; H04N 5/23229; H04N 13/0007; G02B 21/002; B60R 1/00; B60R 2300/303; B60R 2300/607; B60R 2300/105; G06K 9/6203; G06K 9/00791; G06K 9/00798; G06K 9/00805; G06K 9/46

See application file for complete search history.

(56) References Cited

U.S. PATENT DOCUMENTS

| | | | | |
|---|---|---|---|---|
| 7,740,361 B2* | 6/2010 | Jaynes | ........... | H04N 9/3147 345/1.3 |
| 7,864,369 B2* | 1/2011 | Olszak | ........... | G02B 21/002 358/1.9 |
| 8,027,531 B2* | 9/2011 | Wilburn | ........... | H04N 5/247 345/419 |
| 8,818,101 B1* | 8/2014 | Lim | ........... | G06K 9/6203 345/629 |
| 9,087,374 B2* | 7/2015 | Hsu | ........... | G06T 7/0018 |
| 9,098,922 B2* | 8/2015 | Tico | ........... | G06T 3/4038 |
| 9,509,909 B2* | 11/2016 | Liu | ........... | G06T 3/4038 |
| 9,533,618 B2* | 1/2017 | Zhang | ........... | B60R 1/00 |
| 2001/0038718 A1 | 11/2001 | Kumar et al. | | |
| 2004/0085477 A1 | 5/2004 | Majumder et al. | | |
| 2005/0151837 A1 | 7/2005 | Cutler | | |
| 2012/0019614 A1 | 1/2012 | Murray et al. | | |
| 2012/0127324 A1 | 5/2012 | Dickins et al. | | |
| 2012/0249725 A1 | 10/2012 | Corcoran et al. | | |
| 2012/0320203 A1 | 12/2012 | Liu | | |
| 2013/0088578 A1 | 4/2013 | Umezawa et al. | | |
| 2013/0089262 A1* | 4/2013 | Chen | ........... | G06T 5/002 382/218 |
| 2013/0271593 A1 | 10/2013 | Tsujimoto et al. | | |
| 2013/0321671 A1 | 12/2013 | Cote et al. | | |
| 2013/0321674 A1 | 12/2013 | Cote et al. | | |
| 2013/0321677 A1 | 12/2013 | Cote et al. | | |
| 2013/0322746 A1 | 12/2013 | Cote et al. | | |
| 2013/0322753 A1 | 12/2013 | Lim et al. | | |
| 2013/0329002 A1 | 12/2013 | Tico | | |
| 2014/0098229 A1* | 4/2014 | Lu | ........... | H04N 7/181 348/148 |
| 2014/0247352 A1 | 9/2014 | Rathi et al. | | |
| 2014/0247354 A1 | 9/2014 | Knudsen | | |
| 2014/0300687 A1 | 10/2014 | Gillard et al. | | |
| 2014/0327774 A1 | 11/2014 | Lu et al. | | |
| 2014/0362173 A1 | 12/2014 | Doepke et al. | | |
| 2015/0049193 A1 | 2/2015 | Gupta et al. | | |
| 2015/0138312 A1 | 5/2015 | Liu et al. | | |
| 2015/0254825 A1* | 9/2015 | Zhang | ........... | B60R 1/00 382/284 |

OTHER PUBLICATIONS

M. Calonder, V. Lepetit, C. Strecha and P. Fua, BRIEF: Binary Robust Independent Elementary Features in Proceedings of the European Conference on Computer Vision (ECCV), 14 pages, 2010.

* cited by examiner

METHOD, APPARATUS AND SYSTEM FOR PERFORMING GEOMETRIC CALIBRATION FOR SURROUND VIEW CAMERA SOLUTION

CROSS REFERENCES TO RELATED APPLICATIONS

This application claims priority from U.S. Provisional Patent Application No. 61/982,045 filed on Apr. 21, 2014, which is hereby incorporated by reference in its entirety.

BACKGROUND OF THE INVENTION

Field of the Invention

Embodiments of the present invention generally relate to a method and system for performing geometric calibration for a surround view camera solution.

Description of the Related Art

In a multi-camera surround view camera solution, a multi-camera, fisheye input images and video streams are used to generate a bird-eye view of the surroundings in real time. Such a system is used, for example, in vehicles to monitor vehicle surroundings when the driver is driving, parking, changing lanes and the likes. Such a solution helps the driver park safely by allowing him/her to see the entire 360 degree surrounding of the vehicle. FIG. 1 is an embodiment of a multi-camera surround view system in an advanced driver assistance system (ADAS) consisting of four to six wide-angle cameras mounted around a vehicle, each facing one direction. In FIG. 1, the four wide-angle or fisheye cameras are mounted around the vehicle, each facing one direction. Usually two cameras are mounted under side mirrors, one at front bumper, and one at the back bumper. FIG. 2 is an embodiment of a composite bird-eye view of a vehicle is synthesized and shown to the driver in real-time. As shown in FIG. 2, the surround view camera solution synthesizes a 360 degree bird-eye view of the vehicle from four or more input video streams. The goal is to use the images and videos from the multi-camera system to produce a seamlessly stitched 360 degree composite view that looks like it were taken by a single camera above the vehicle.

Therefore, there is a need for a method, apparatus and/or system for processing a seamless view from a surround view camera system.

SUMMARY OF THE INVENTION

Embodiments of the present invention relate to method, apparatus and a system multi-camera image processing method. The method includes performing geometric alignment to produce a geometric output by estimating fish eye distortion correction parameters, performing initial perspective correction on related frame, running corner detection in the overlapping areas, locating the stronger corner, calculating brief descriptors for features and match feature point from two cameras using brief scores, performing checks and rejecting wrong feature matches, finding perspective matrices to minimize distance between matched features; and creating a geometric lookup table.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The goal of this solution is to produce a seamlessly stitched 360 degree composite view from four fisheye camera input. This is achieved by three key components of the solution: geometric alignment algorithm, photometric alignment algorithm, and synthesis algorithm. Geometric alignment corrects fisheye distortion from the original input video frames and converts each input video frame from its respective perspective to a common bird-eye perspective. Photometric alignment corrects the brightness and color mismatch between adjacent views to achieve seamless stitching. Finally, the synthesis algorithm generates the composite surround view after geometric and photometric corrections and simultaneously it collects statistics that are required for the photometric alignment algorithm. In a preferred embodiment, such a solution would be the requirement of an embedded system.

Figure 3A:
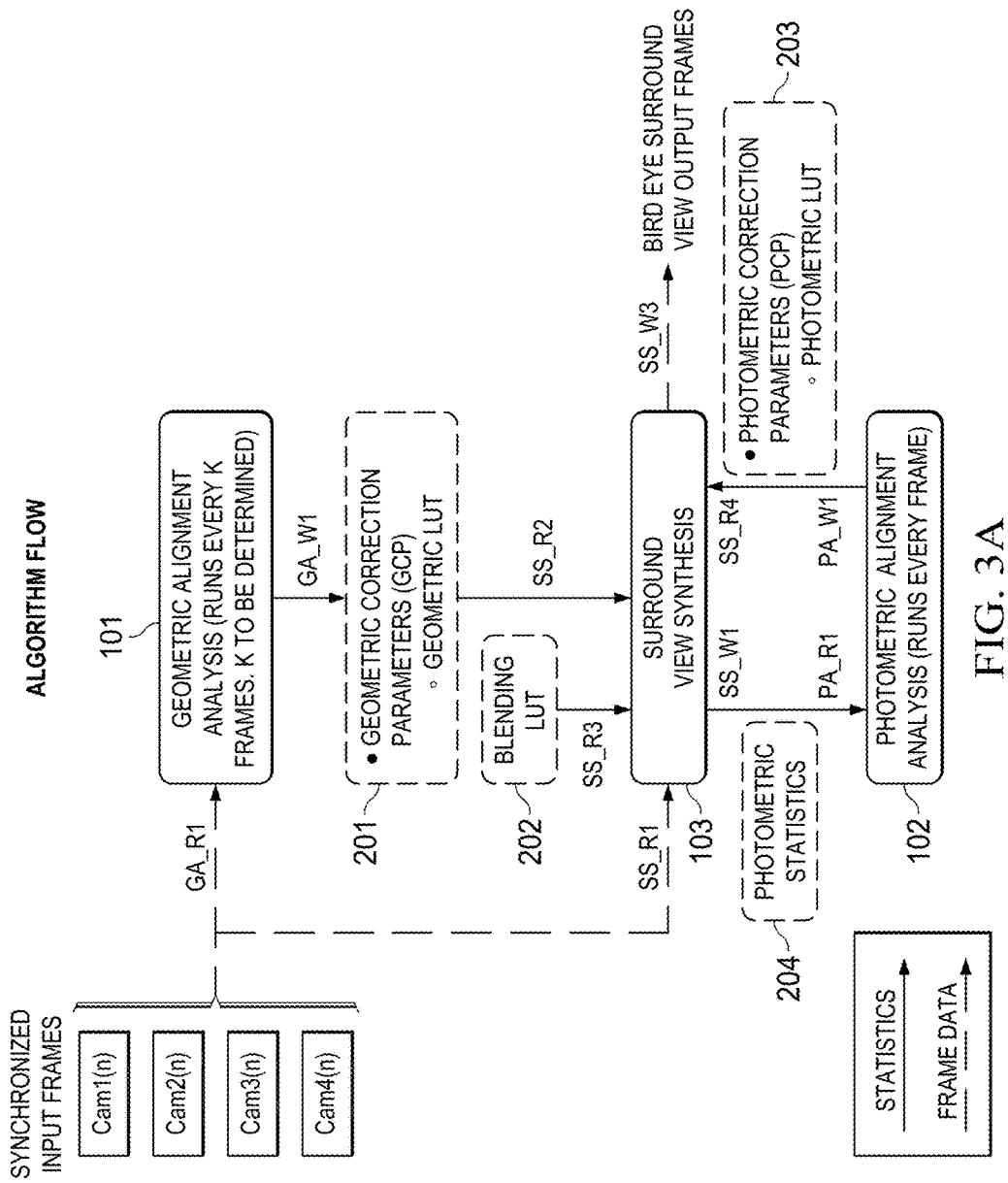
FIG. 3A is an embodiment of a flow diagram of method depicting a surround view solution.

FIG. 3 is an embodiment of a flow diagram of method 300 depicting a surround view solution. Block 101 represents the step of performing geometric alignment analysis. The input to geometric alignment analysis are four synchronized video streams from fisheye cameras, cam1(n)-cam4(n), each camera has a 180-degree field of view (FoV). Geometric alignment output a look-up-table (Geometric LUT), shown in block 201. The Geometric LUT specifies how to synthesize each pixel in the output frame from the four input frames. Since geometric alignment parameters, i.e., the LUT, only depends on the location of the cameras and they do not change significantly after the initial installation, block 101 is usually called by the system framework every K frames, K>1, to update the geometric LUT. In one embodiment, block 101 is called only once when the system is powered up. After it finishes, geometric LUT is then saved to the memory.

Figure 4:
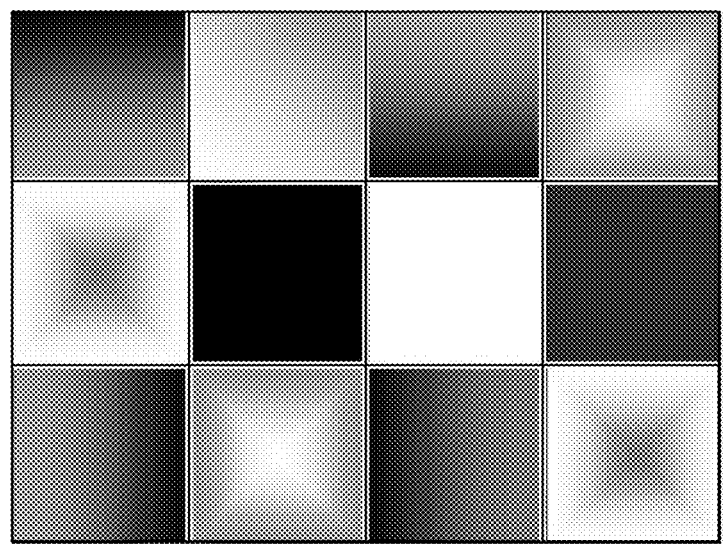
FIG. 4 is an embodiment of a geometric alignment chart.

The goal of geometric alignment is to transform and align four input fish eye lens frames so that the stitched bird's eye view output is seamless. To achieve this we are following a chart based approach. Such an algorithm is designed to be as flexible with the chart content, with the ultimate goal of removing charts altogether. Nevertheless, distinctive chart content may help the algorithm in terms of finding and matching features. One particular chart design that we used extensively is shown in FIG. 4. FIG. 4 is an embodiment of a geometric alignment chart.

Figure 3B:
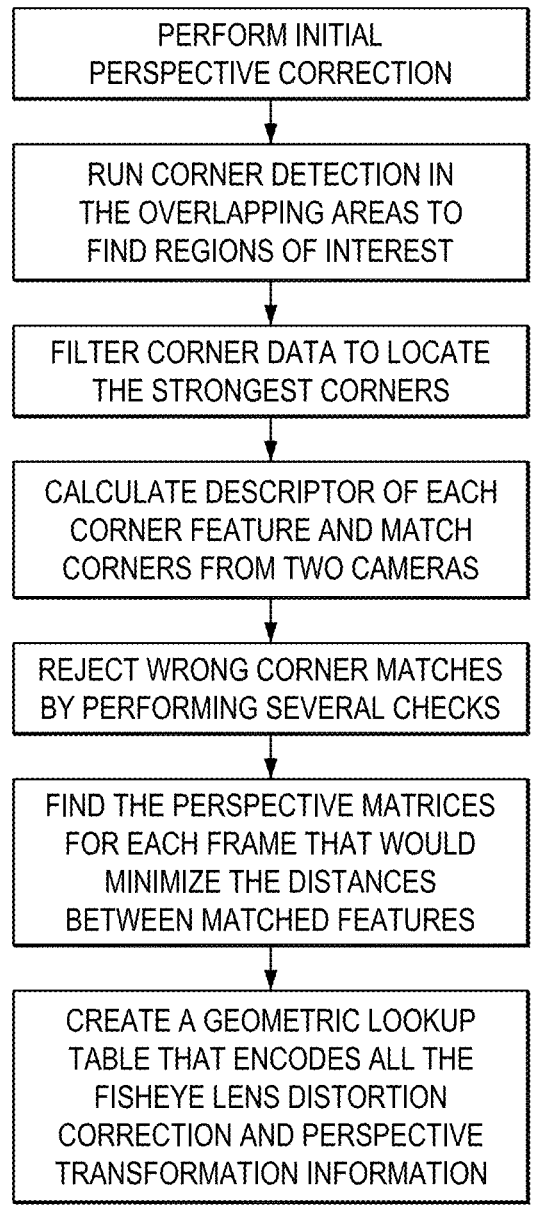
FIG. 3B is an embodiment of a flow diagram of method depicting a geometric alignment.

FIG. 3B is an embodiment of a flow diagram of method depicting a geometric alignment. For the geometric alignment, one such chart is placed in each of the overlapping regions shown in FIG. 4 and one frame from each camera is captured simultaneously. The algorithm steps for geometric alignment are as follows: (1). Perform initial perspective correction on each frame. The parameters for such correction may be obtained from camera placement specifications or estimated from the frame content itself; (2). Run Harris corner detection, or the likes, in the overlapping areas to find regions of interest; (3). Filter Harris corner data to locate the strongest corners; (4). Calculate BRIEF descriptor of each corner feature and match corners from two cameras using BRIEF scores; (5). Reject wrong corner matches by performing several checks; (6). Find the perspective matrices for each frame that would minimize the distances between matched features; (7). Create a geometric lookup table that encodes all the fisheye lens distortion correction and perspective transformation information to create the stitched output frame from input frames in a single step.

Figure 1:
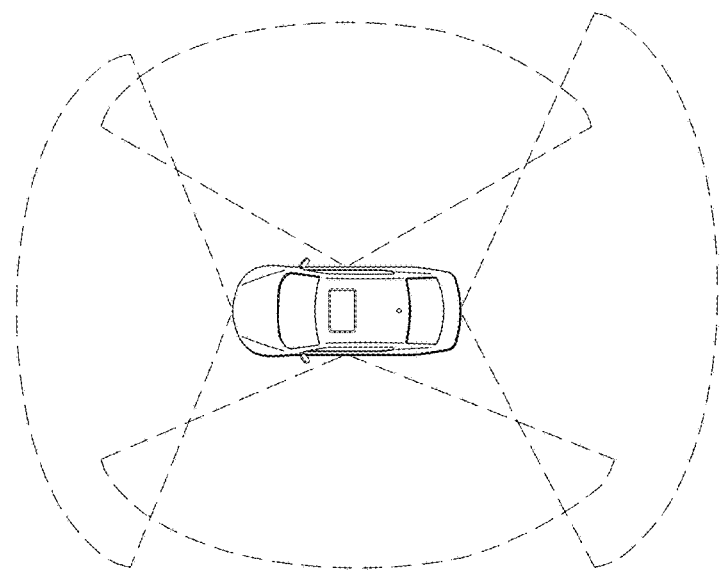
FIG. 1 is an embodiment of a multi-camera surround view system in an advanced driver assistance system (ADAS) consisting of four to six wide-angle cameras mounted around a vehicle, each facing one direction.
Figure 3C:
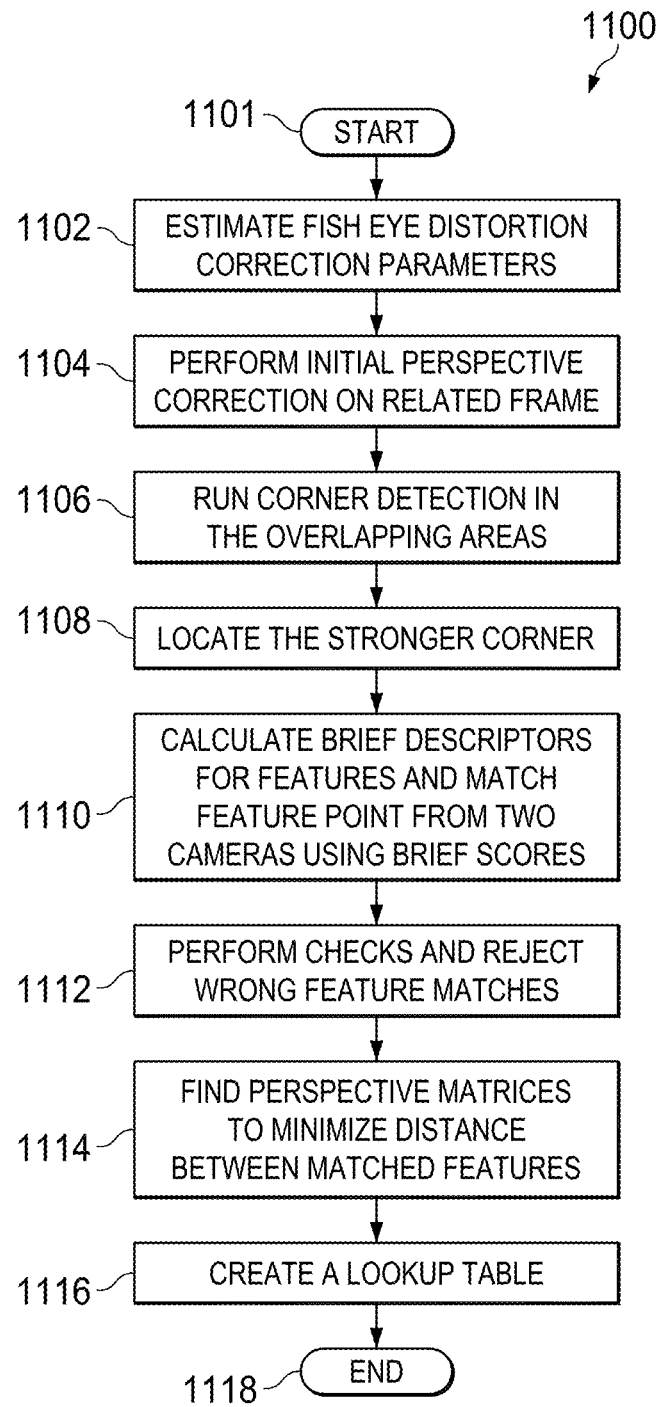
FIG. 3C is an embodiment of a flow diagram of a method depicting geometric calibration.

FIG. 3C is an embodiment of a flow diagram of a method 1100 depicting geometric calibration. For the geometric alignment, one such chart is placed in each of the overlapping regions shown in FIG. 1 and one frame from each camera is captured, for example, images are captured simultaneously from more than one camera. The method 1100 begins at step 1101 and proceeds to step 1102. At step 1102, the method 1100 estimates fish eye distortion correction parameters from input frames. For fish-eye distortion correction, a standard radial distortion model maybe used. The fish-eye affect in original input frames is removed by applying the inverse transformation of the radial distortion function. In step 1104, the method 1100 performs an initial perspective correction on the frames. The parameters for this correction can be obtained from camera placement specifications or estimated from the frame content itself. At step 1106, the method 1100 runs a corner detection module, such as Harris corner, to detect corners in the overlapping areas to detect corners. The output of this step is a map that is usually the same size as the input image, and the value at each location may indicate the strength of the Harris corner.

At step 1108, the method 1100 filters corner maps, such as Harris corner maps, to locate the strongest corners. In this step, the Harris corner strength maps may be divided into 7×7 blocks, for example. Then value and the coordinates of the pixel may be found with the maximal Harris corner strength within the blocks. If the pixel with maximal strength is not located at the boundary of the block, it is counted as a valid feature; otherwise, it is discarded. By doing so, the feature points are collected from the Harris corner map and the top 100 feature points are kept with the strongest Harris corner strength. Furthermore, features whose strength is smaller than a threshold may be eliminated. At step 1110, the method 1100 calculates BRIEF descriptor of the feature and match feature points from two cameras using BRIEF scores. In this step, the BRIEF descriptors of the feature are calculated. As shown in Table 1, for two adjacent cameras, denoted as camera i and camera j, a BRIEF score for each pair of features in the overlapping region of camera i and j are computed, one feature comes from camera i, and the other from camera j. The BRIEF score describes how similar two BRIEF descriptors are by taking "XOR" operation between two BREIF descriptors. The smaller the BRIEF score, the more similar the descriptors are. We repeat the process for all the camera pairs. After that, a table of BRIEF scores for camera i and camera j is obtained. With this table, we find the top matching feature in cam j to that of cam i, and vise visa. We follow the same procedure for each pairs of cameras, in our case, cam 1 & 2, cam 2 & 3, cam 3 & 4, and cam 4 & 1. Thus, Table 1 shows BRIEF scores between feature m from Cam i and feature n from Cam j. m=1, 2, . . . , $N_i$, and n=1, 2, . . . , $N_j$, i=1, 2, 3, 4, and j=(i+1)mod 4.

TABLE 1

| Cam i | Cam j | | | |
|---|---|---|---|---|
| | 1 | 2 | . . . | $N_j$ |
| 1 | | | | |
| 2 | | | | |
| . . . | | | | |
| $N_i$ | | | | |

Figure 6:
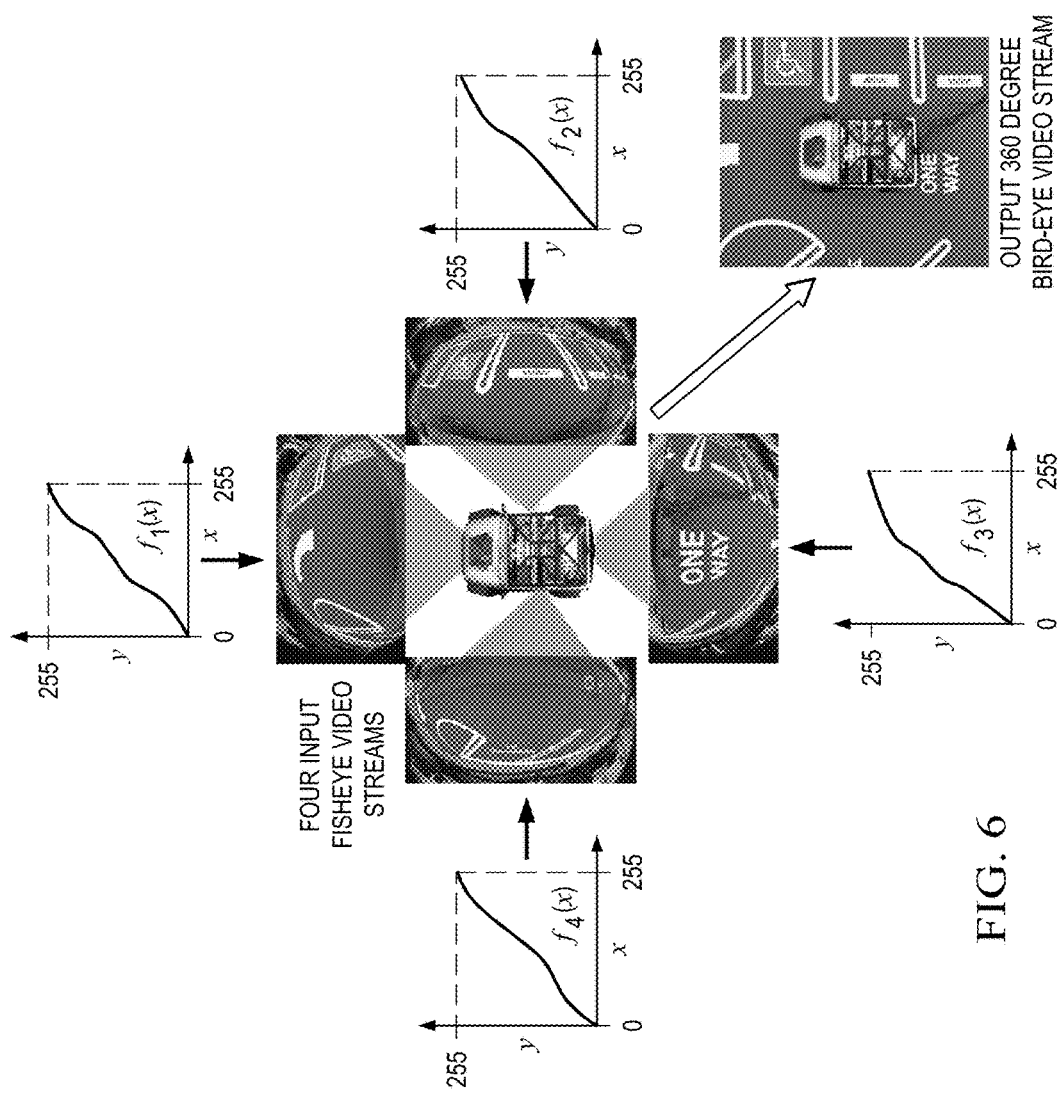
FIG. 6 is an embodiment of a tone mapping curves and photometric alignment correction.

At step 1112, the method 1100 rejects wrong feature matches by performing several checks. One check that may be performed is to compute the Euclidean distance between the coordinates for the two matched features. If their physical distance is larger than a threshold, we eliminate such matches. Another check is, if feature m in Cam i is the best match to feature n in Cam j; however, feature n in Cam j is not the best match to feature m in Cam i, such matches may be eliminated. At step 1114, the method 1100 finds the perspective matrices for each frame that would minimize the distances between matched features. With the matched features, the perspective matrix for each input frame may be optimized. The composite surround view and the contribution from each input camera as well as the overlapping regions between adjacent cameras are shown in FIG. 6. The perspective transformation for camera 1 are estimated, considering the features contained in both $O_{(4,1)}$ and $O_{(1,2)}$, we then update the frame from Cam 1 with the estimated perspective transformation. Next, the perspective transformation for Cam 3 are estimated, considering the features contained in both $O_{(3,4)}$ and $O_{(2,3)}$. Similarly, the frame from Cam 3 is updated with the estimated perspective matrix. Next, the same procedure is followed for Cam 2, then followed by Cam 4. After that, an iteration of perspective matrix update is computed. Such a process may be repeated for N iterations. In some case, we found that normally after 10 iterations, we converge to a good set of perspective transformation for each input frame.

At step 116, the method 1100 creates a lookup table that encodes the fisheye lens distortion correction and perspective transformation information to create the stitched output frame from input frames in a single step. This algorithm may output either the final perspective transformation parameters (one perspective transformation matrix for each camera), the fisheye distortion correction parameters, and/or output a LUT to encode both information. In such an implementation, a geometric LUT may be generated. The geometric LUT has a similar resolution as the output composite image. In each entry of this LUT, we specify the camera ID (i.e., from which input camera) and the coordinates in that camera from where an input pixel should be fetched to generate the output pixel Block 102 represents the step of performing photometric alignment analysis function. Photometric alignment analysis uses statistics, shown in block 204, as the input. Photometric alignment analysis outputs a Photometric LUT, shown in block 203, for each camera/view and for each color channel. In one embodiment, the photometric LUT maps an input value (0~255) to an output value (0~255). The goal of photometric correction is to correct the brightness and color mismatch among the four views so that there is no visible seams in the composite surround view. This is achieved by applying tone mapping to each view before stitching.

Figure 5:
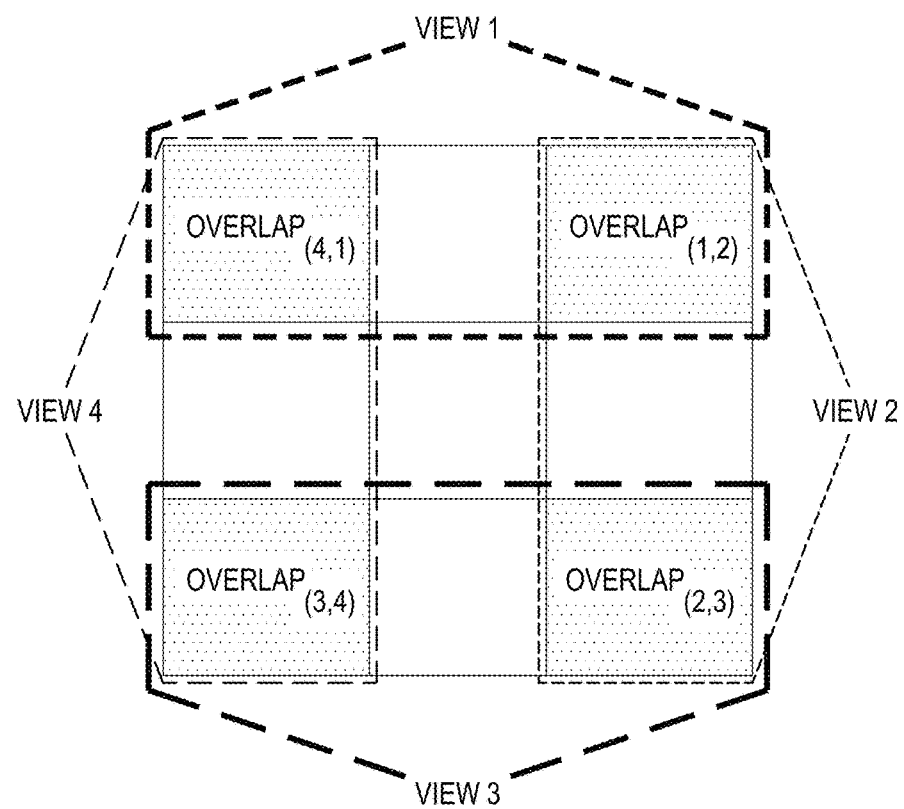
FIG. 5 is an embodiment of views and overlapping regions in the composite surround view.

FIG. 5 is an embodiment of views and overlapping regions in the composite surround view. As shown in FIG. 5, the composite surround view consists of data from all four input frames, view 1, 2, 3, and 4. The overlapping regions are the portion of the frames that come from the same physical world and captured by two adjacent cameras, for example, Overlap$_{(1,2)}$ refers to the overlapping region between view 1 and view 2, and so on. The Photometric alignment function (block 102 in FIG. 3) uses data in Overlap$_{(1,2)}$, Overlap$_{(2,3)}$, Overlap$_{(3,4)}$, and Overlap$_{(4,1)}$ to estimate a tone mapping curve for each camera and each color channel.

FIG. 6 is an embodiment of a tone mapping curves and photometric alignment correction. The tone mapping curves, as shown in FIG. 6, are functions that map an input value to an output value. For RGB input data format, $\{f_1^{(k)}(x), f_2^{(k)}(x), f_3^{(k)}(x), f_4^{(k)}(x)\}$ are jointly optimized for all four views (i.e., cameras), but independently for each color channel, k=1, 2, 3.

Block 103 represents the step of performing synthesis function, which may execute every frame. The input to the synthesis function are: (1). the fisheye frames from the four cameras, cam1(n)-cam4(n); (2). the geometric LUT outputted from the geometric alignment analysis; (3). the photometric LUT, of block 203; and (4). the blending LUT (block 202). Synthesis function outputs the composite surround view frame. Synthesis function also outputs photometric statistic to the photometric function, which is used to generate the photometric LUT. The geometric LUT maps each output pixel location with a corresponding pixel locations in the input images. Each of the output pixel comes from either a single pixel from one input camera or two pixels from two adjacent cameras, in the overlapping regions. The blending LUT specifies a weight for each pair of pixels that belong to the same object in the physical world, but captured by two adjacent cameras. With blending operation, the visibility of seams in adjacent camera transitions is eliminated. The photometric LUT specifies how to map an input pixel value to an output pixel value so that the brightness and color of adjacent views are matched at the overlapping region.

The Synthesis function has two outputs: 1) the composite surround view frame, and 2) the statistics for photometric function, shown in block 204. Statistics required by photometric function are block average of the input frames in the overlapping regions for each color channel. Ideally, the statistics should be collected by the photometric alignment block independent of synthesis function, but that will significantly increase memory bandwidth. To reduce memory bandwidth, these statistics in synthesis function, of block 103, are collected for the current frame (frame n) and use the statistics for photometric correction during frame (n+1). Such a design limits all pixel-level computational intensive operation required for every frame to the Synthesis function, but not in photometric function, of block 102. Such a method significantly reduces memory bandwidth.

For off-line calibration approach, geometric function, of block 101, may be called once when the system is powering on. Geometric LUT is usually saved in memory and accessed by synthesis function, of block 103, usually at every frame. For a dynamic calibration approach, geometric LUT may be called every K frames, e.g., K=600, and therefore, the geometric LUT may be updated only every K frames. In one embodiment, the synthesis of block 103 preferably uses the most recent geometric LUT from the memory to generate the output frame.

Thus, in one embodiment, at frame n, synthesis function takes four input fisheye frames, the most recent geometric LUT, and the current photometric LUT, and output a composite surround view frame. The Photometric function also runs every frame and takes the statistics collected by Synthesis function at frame (n−1), it outputs a photometric LUT for the current frame (frame n). The Geometric function runs asynchronously with Photometric and Synthesis functions and only updates the Geometric LUT in memory every K frames (K>1), or in our current implementation, only update it once when the system is powered up.

The design of such a surround view solution has several novelties, for example: (1). Such a framework incorporates both the dynamic calibration approach and the one-time calibration approach; (2). All pixel level operation that is required for every frame is carried out in Synthesis function (block 103). All necessary operations happen when we go through each output pixel in the composite view in Synthesis. It greatly reduces memory bandwidth requirement since Photometric function, of block 102, no longer needs to access the input frame data. (3). The output of the Geometric function 101, shown in block 201, and the blending weights, of block 202, are both saved in the form of LUT in the memory to save computation, by reducing on-the-fly computation at every frame; (4). In one embodiment, the output of the Photometric function 102, shown in block 203, is designed to be a LUT which has 255 entries for 8-bit data input. It not only provides sufficient quality, also ensures fast implementation as it is a global operation independent of spatial neighborhood; (5). The entire data flow is our unique creation for efficient memory usage and computation targeting embedded platforms. Geometric function 101 and photometric function of block 102 are also novel.

Synthesis function receives input video streams from four fish-eye cameras and creates a composite surround view. Mapping of each output pixel location to the corresponding pixel locations in input images are stored in the geometric LUT. As Shown in FIG. 5, there are some overlap regions in the output frame. In these regions, each output pixel will map to two pixels in two different input images. Based on how we handle these pixels in the overlap regions, we have a simple and a blending stitch method.

Figure 7:
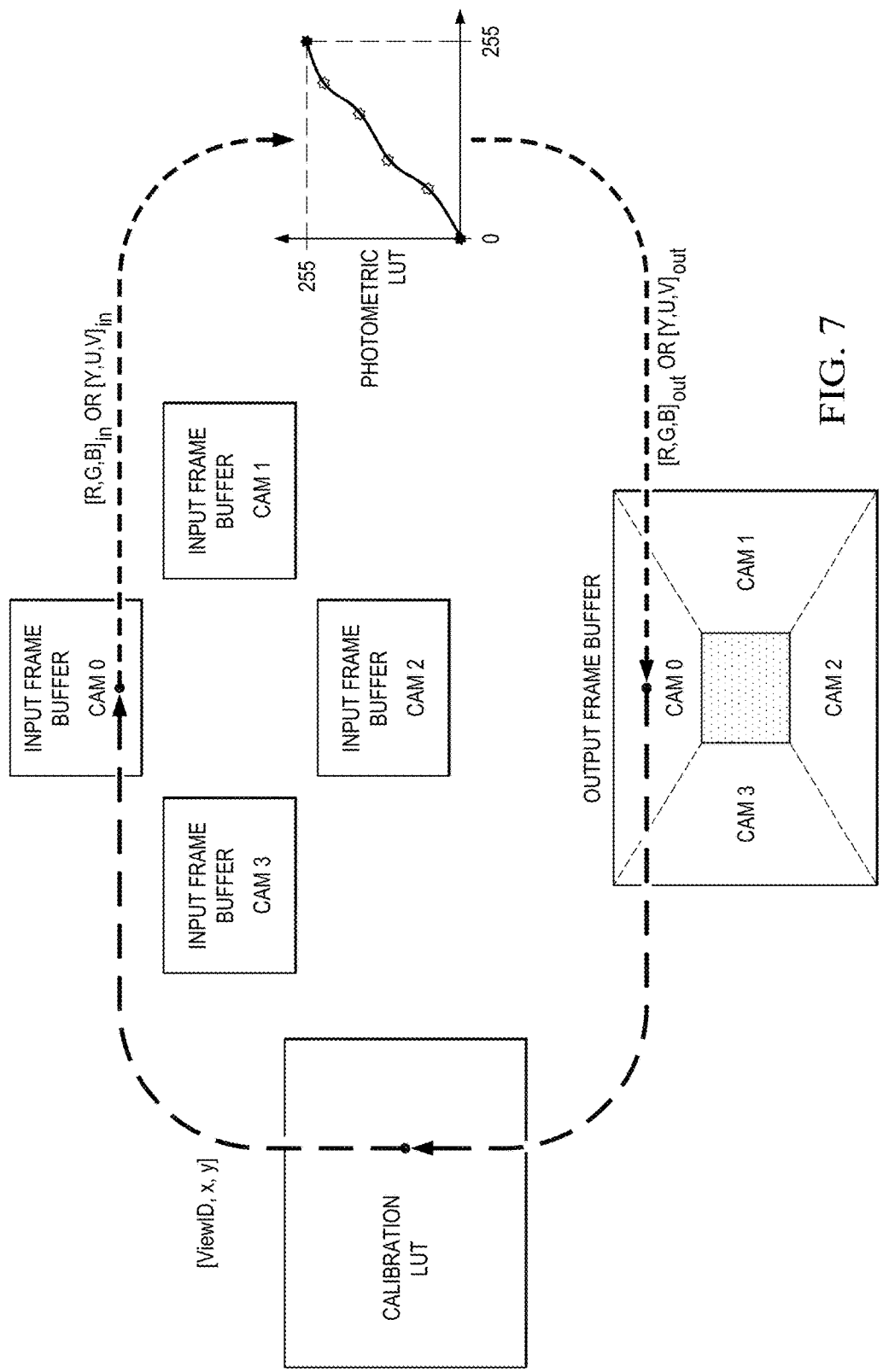
FIG. 7 is an embodiment of a synthesis using the basic stitching method.

FIG. 7 is an embodiment of a tone mapping curves and photometric alignment correction. FIG. 7 illustrates an embodiment of a stitching method. The geometric LUT stores a valid location for each output pixel location with a corresponding pixel location in one of the input images. The decision boundary, which chooses between input images in the overlap region, is usually fixed. Then the photometric LUT specifies how to map the input pixel value to an output pixel value so that the brightness and color of adjacent camera images are matched at the overlapping region.

For RGB input images, the same geometric LUT is usually used for each of the three color channels and pixels are fetched from input images based on geometric LUT. For YUV data, there may be separate LUTs for the Y-plane and the UV-plane, since the UV-plane is typically lower resolution when compared to Y-plane. The LUT for the UV-plane is generated by down-sampling the location indices of the Y-plane accordingly.

For stitching with blending, the geometric LUT corresponding pixel stores location from both images in the overlapping regions. A separate blending LUT specifies weights for each pair of pixels in the two input images. Blending helps in eliminating the visible seams in adjacent camera transitions.

Figure 8:
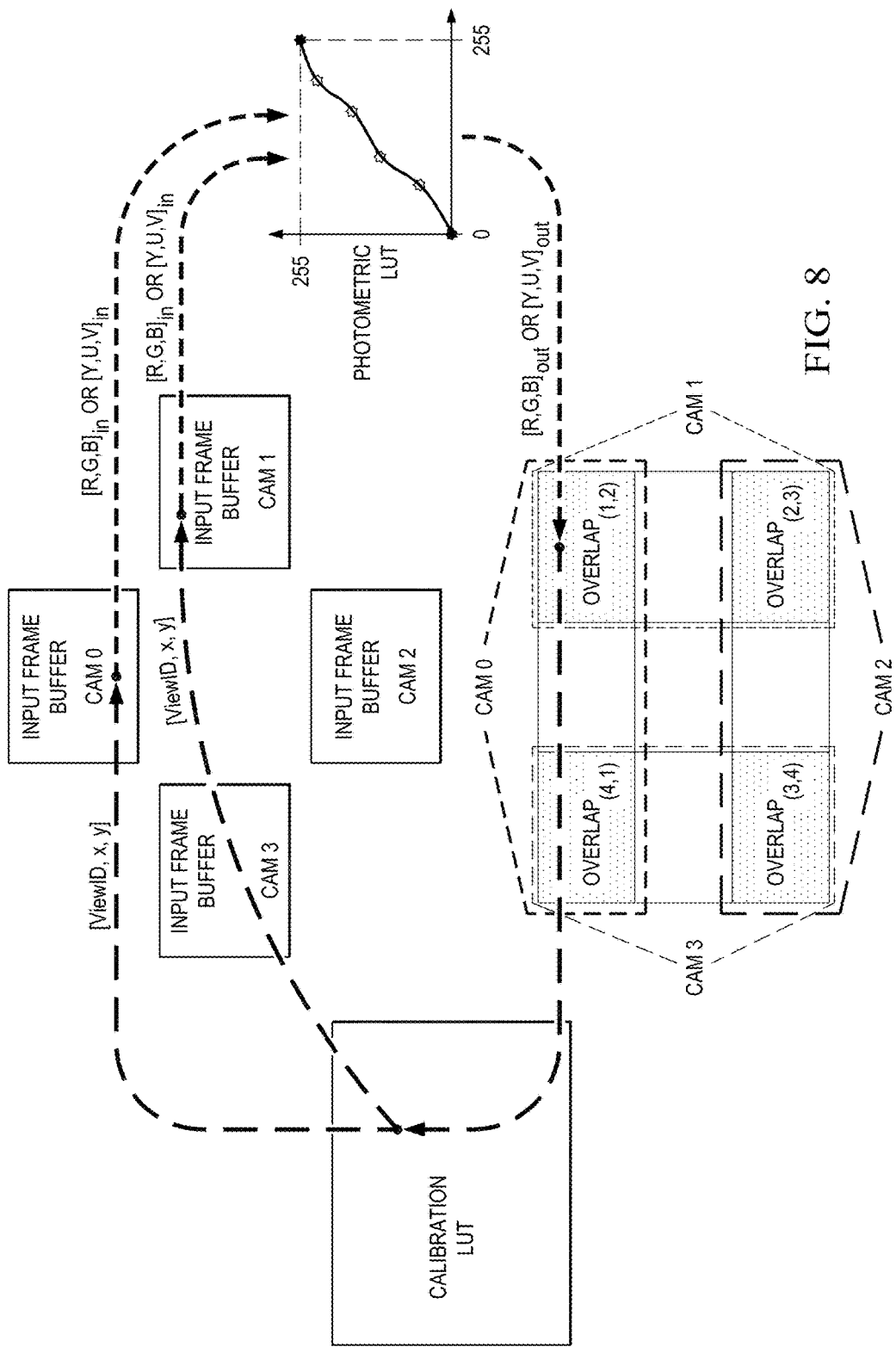
FIG. 8 is an embodiment of a synthesis using the blending method for invisible seam between adjacent cameras.

FIG. 8 illustrates the stitching with blending. The geometric LUT stores different information for non-overlapped and overlapped regions. For each pixeln the non-overlap regions, geometric LUT stores the coordinates of a corresponding pixel location in one of the input images and the view ID of that input image. For each pixel in overlapped regions, the geometric LUT stores the coordinates of two input pixel locations in two of the input images and the view IDs of those input images. In the overlapping regions, we blend the pixels from two images using a linear combination of weights. The weights for each pixel are pre-stored in another LUT which we refer to as the blending LUT. The photometric LUT is used to correct the value of each input pixel, before we blend them for output image.

Figure 9:
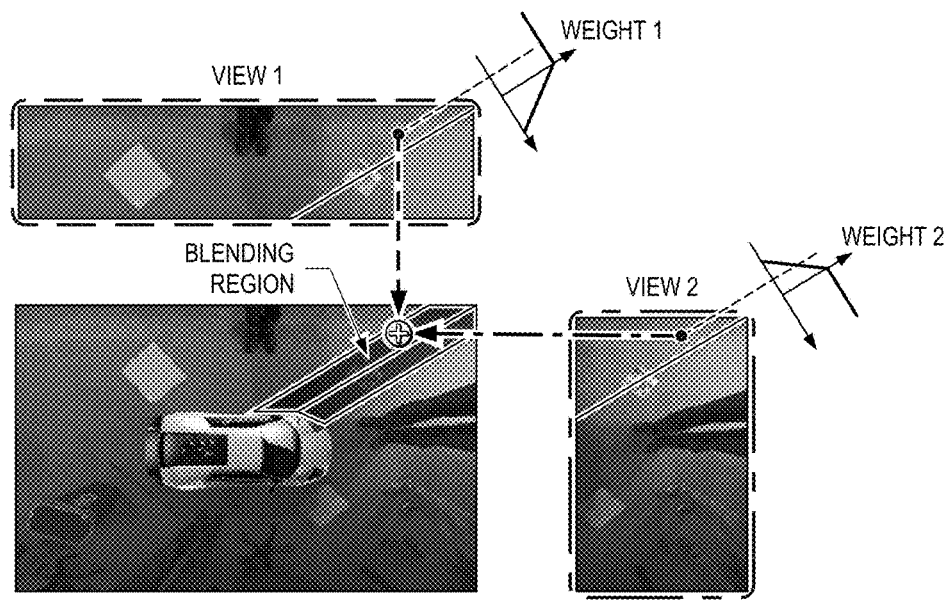
FIG. 9 is an embodiment illustrating blending.

FIG. 9 shows an illustration of the blending for the overlapping regions. It also shows the linear profile of the blending weight. The weight associated with the secondary view decreases as we move away from the decision/overlapping boundary.

Similar to the simple stitching regions, the blending regions have different LUTs for the Y- and UV-planes. But with RGB input images, the same geometric LUT is used for each of the three color channels. FIG. 9 shows an example of synthesis with blending.

Statistics required by photometric function are block average of the input frames in the overlapping regions for each color channel (R,G,B channels for RGB image and Y,U,V channels for YUV frames). Ideally, the statistics should be collected by the photometric alignment block independent of synthesis function, but that will significantly increase memory bandwidth. To reduce memory bandwidth, we collect these statistics in Synthesis function. The synthesis function is accessing pixels from both corresponding images in order to generate the output view, which enables us to combine the task of statistic collection with output synthesis function.

Figure 2:
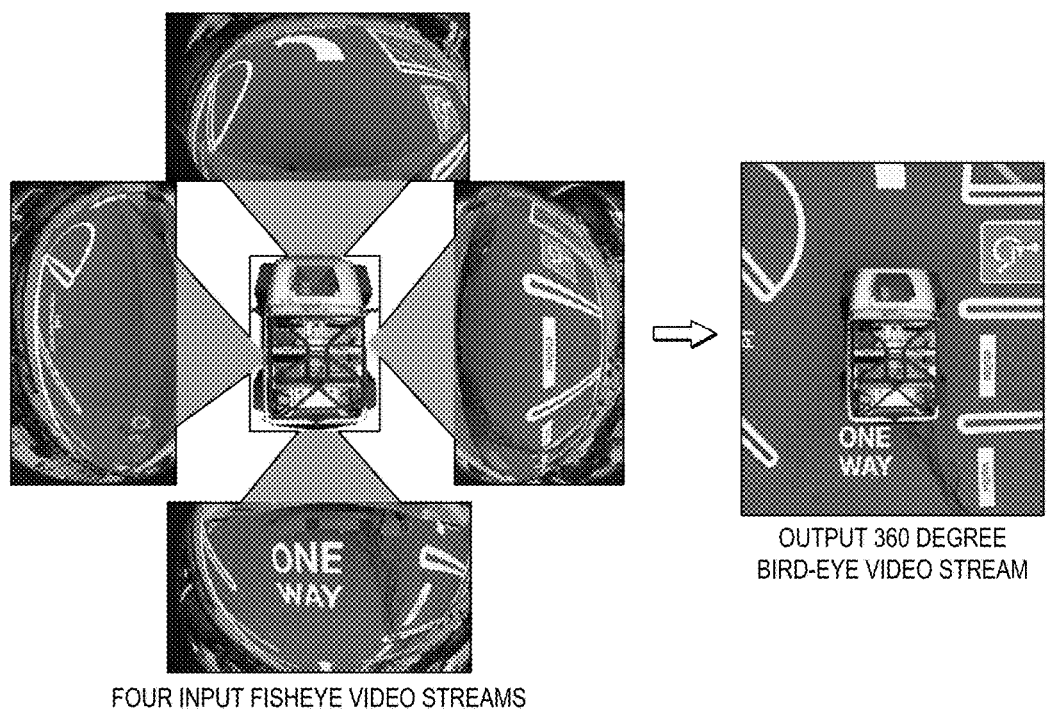
FIG. 2 is an embodiment of a composite bird-eye view of a vehicle is synthesized and shown to the driver in real-time.
Figure 10:
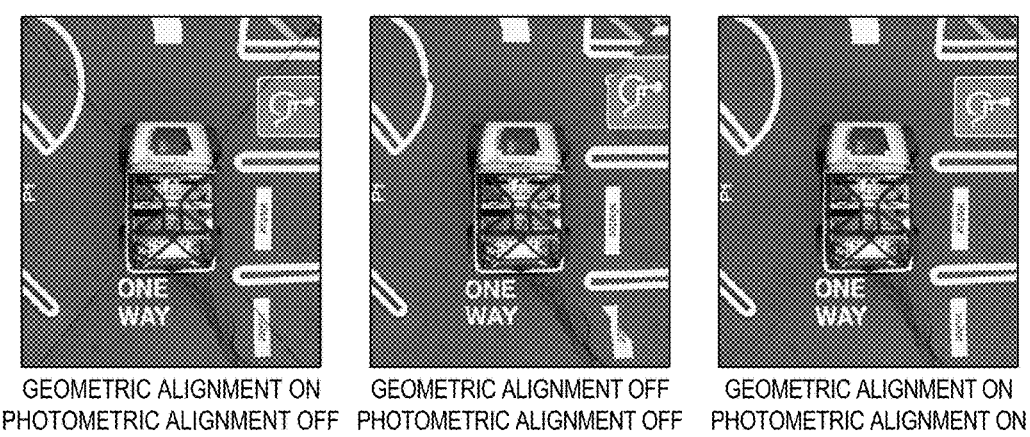
FIG. 10 is an embodiment of a resulting image and/or video from a multi-camera system to produce a seamlessly stitched 360 degree composite view.

FIG. 10 is an embodiment of a resulting image and/or video from a multi-camera system to produce a seamlessly stitched 360 degree composite view. FIG. 10 is an example output from the proposed surround view camera solution. The first image shows the result with geometric alignment ON and photometric alignment OFF, the second image shows the image produced with geometric alignment ON and photometric alignment OFF, and finally, the last image is the output image when both geometric and photometric alignment are ON. The four fisheye input frames are shown in FIG. 2. As shown in the second image of FIG. 10, the composite surround view has inaccurate geometric alignment and no photometric alignment algorithm. Also, there are large geometric errors at view stitching boundaries and large photometric misalignment among, color and brightness, and very noticeable seams. The composite surround view with the proposed geometric alignment algorithm, but with no photometric correction, is shown in the first image of FIG. 10. In this image, the geometric errors are corrected, but photometric errors still exist. The third image is the composite surround view with our geometric and photometric algorithm algorithms. This time, both geometric and photometric misalignments are corrected. Also, a seamlessly stitched 360 degree surround view is achieved.

Even though the presented embodiments show four camera input and output a bird-eye 360 surround view of a vehicle, the proposed solution is designed to extend to any number of cameras. Although our driven use-case is automotive application, it can be adapted easily for other multi-camera applications, such as surveillance cameras, since the underlying fundamental problems remain the same, for example, geometric alignment, photometric alignment, and synthesis.

While the foregoing is directed to embodiments of the present invention, other and further embodiments of the invention may be devised without departing from the basic scope thereof, and the scope thereof is determined by the claims that follow.

What is claimed is:

1. A multi-camera image processing method, comprising:
performing a geometric alignment to produce a geometric output, wherein the geometric alignment includes:
estimating fish eye distortion correction parameters;
correcting for fish eye lens distortion based on the fish eye distortion correction parameters;
performing an initial perspective correction on a frame;
performing corner detection in overlapping areas;
locating a corner;
calculating descriptors for features;
matching a feature point from two cameras scores;
performing checks and rejecting feature matches;
finding perspective matrices to minimize a distance between matched features; and
creating a geometric lookup table.

2. The multi-camera image processing method of claim 1 further comprising:
performing a photometric alignment to produce a photometric output and a blending output;
using an output from the geometric alignment and the photometric alignment for performing a synthesis function for at least one of blending and stitching images from multiple cameras; and
displaying an image from the synthesis function.

3. The multi-camera image processing method of claim 2, wherein the synthesis function comprises using an alpha blend to blend images from adjacent cameras at a seam boundary to eliminate irregularities at a seam caused by image data from the adjacent cameras.

4. The multi-camera image processing method of claim 2, wherein the geometric alignment comprises a camera calibration.

5. The multi-camera image processing method of claim 4, wherein the camera calibration is at least one of a dynamic calibration and a one-time calibration.

6. The multi-camera image processing method of claim 2, wherein inputs to the synthesis function are fisheye frames from the multiple cameras, the geometric output, and the photometric output.

7. The multi-camera image processing method of claim 2, wherein the geometric output, the photometric output and the blending output are saved in the form of a lookup table in a memory, a geometric lookup table and a photometric lookup table, respectively.

8. The multi-camera image processing method of claim 7, wherein an output of the photometric lookup table has 255 entries for 8-bit data input.

9. The multi-camera image processing method of claim 2, wherein the geometric alignment comprises camera calibration using calibration charts independent of any camera parameters.

10. The multi-camera image processing method of claim 2, wherein the geometric alignment comprises:
performing the initial perspective correction on each frame;

running corner detection in the overlapping areas to find regions of interest;
filtering corner data to locate a strong corner;
calculating at least one descriptor of the corner feature and matching the corner from two cameras using scores;
finding perspective matrices for each frame for minimizing distances between matched features; and
creating a geometric lookup table that encodes fisheye lens distortions correction and perspective transformation information.

11. An advanced driver assistance (ADAS) system, comprising:
a multi-camera surround view system configured to:
perform geometric alignment to produce a geometric output;
estimate fish eye distortion correction parameters;
correct for fish eye lens distortion based on the fish eye distortion correction parameters;
perform initial perspective correction on a frame;
perform corner detection in overlapping areas;
locate a corner;
calculate descriptors for features;
match feature point from two cameras scores;
perform checks and rejecting feature matches;
find perspective matrices to minimize a distance between matched features; and
create a geometric lookup table.

12. The ADAS system of claim 11 wherein the multi-camera surround view system is further configured to:
perform photometric alignment to produce a photometric output and a blending output;
use data from the geometric alignment and the photometric alignment for performing a synthesis function for at least one of blending and stitching images from multiple cameras; and
display an image from the synthesis function.

13. The ADAS system of claim 12, wherein the multi-camera surround view system is further configured to use an alpha blend to blend images from adjacent cameras at a seam boundary to eliminate irregularities at a seam caused by image data from the adjacent cameras.

14. The ADAS system of claim 12, wherein the geometric alignment comprises a camera calibration.

15. The ADAS system of claim 14, wherein the camera calibration is at least one of a dynamic calibration and a one-time calibration.

16. The ADAS system of claim 14, wherein inputs to the synthesis function are fisheye frames from the multiple cameras, the geometric output, and the photometric output.

17. The ADAS system of claim 12, wherein the geometric output, the photometric output and the blending output are saved in the form of a lookup table in a memory, a geometric lookup table and a photometric lookup table, respectively.

18. The ADAS system of claim 17, wherein an output of the photometric lookup table has 255 entries for 8-bit data input.

19. The ADAS system of claim 12, wherein the geometric alignment comprises camera calibration using calibration charts independent of any camera parameters.

20. The ADAS system of claim 12, wherein the geometric alignment comprises:
performing an initial perspective correction on each frame;
running corner detection in the overlapping areas to find regions of interest;
filtering corner data to locate a strong corner;
calculating at least one descriptor of the corner feature and matching the corner from two cameras using scores;
finding perspective matrices for each frame for minimizing distances between matched features; and
creating a geometric lookup table that encodes fisheye lens distortions correction and perspective transformation information.

* * * * *